(12) United States Patent
Yasuda et al.

(10) Patent No.: US 9,587,594 B2
(45) Date of Patent: Mar. 7, 2017

(54) EVAPORATED FUEL PROCESSING APPARATUS

(71) Applicant: AISAN KOGYO KABUSHIKI KAISHA, Obu-shi, Aichi-ken (JP)

(72) Inventors: Yoshihiro Yasuda, Toyota (JP); Takashi Kato, Obu (JP)

(73) Assignee: Aisan Kogyo Kabushiki Kaisha (JP)

( * ) Notice: Subject to any disclaimer, the term of this patent is extended or adjusted under 35 U.S.C. 154(b) by 6 days.

(21) Appl. No.: 14/574,871

(22) Filed: Dec. 18, 2014

(65) Prior Publication Data

US 2015/0176543 A1    Jun. 25, 2015

(30) Foreign Application Priority Data

Dec. 25, 2013   (JP) ................................. 2013-267593

(51) Int. Cl.
*B01D 53/04* (2006.01)
*F02M 25/08* (2006.01)
*B01D 45/08* (2006.01)

(52) U.S. Cl.
CPC ......... *F02M 25/0854* (2013.01); *B01D 45/08* (2013.01); *B01D 53/0415* (2013.01);
(Continued)

(58) Field of Classification Search
CPC .... B01D 45/08; B01D 53/04; B01D 53/0415; B01D 2257/702; B01D 2259/4516; F02M 25/0854; F02M 2025/0863
(Continued)

(56) References Cited

U.S. PATENT DOCUMENTS

| 4,658,796 A | 4/1987 | Yoshida et al. |
| 4,852,761 A * | 8/1989 | Turner ............ B60K 15/03504 |
| | | 123/519 |

(Continued)

FOREIGN PATENT DOCUMENTS

| EP | 1650425 A1 | 4/2006 |
| JP | S59-165854 A | 9/1984 |

(Continued)

OTHER PUBLICATIONS

Office Action, issued Nov. 2, 2015, in Korean Patent Application No. 10-2014-0157885.
(Continued)

*Primary Examiner* — Frank Lawrence
(74) *Attorney, Agent, or Firm* — Wood, Phillips, Katz, Clark & Mortimer (57) ABSTRACT

An evaporated fuel processing apparatus includes a casing provided with a tank port, and the casing is provided with at least one adsorbent layer filled with adsorbent which adsorbs/desorbs evaporated fuel generated in a fuel tank or the like, a vapor-liquid separator separating the evaporated fuel introduced from the tank port into a vapor phase component and a liquid phase component thereof, respectively, and a filter separating the vapor-liquid separator from the adsorbent layer, and, a liquid storing member which is a component separate from the casing, and is opened at at least a tank port side for storing the separated liquid phase component is attached in the casing, and the filter is fixed to an inner circumferential surface of the casing and the liquid storing member is sandwiched between the casing and the filter.

6 Claims, 7 Drawing Sheets

(52) U.S. Cl.
CPC .................. *B01D 2257/702* (2013.01); *B01D 2259/4516* (2013.01); *F02M 2025/0863* (2013.01)

(58) Field of Classification Search
USPC .............. 123/519; 96/134, 137, 149; 95/146
See application file for complete search history.

(56) References Cited

U.S. PATENT DOCUMENTS

| | | | |
|---|---|---|---|
| 4,853,009 A | 8/1989 | Turner et al. | |
| 4,894,072 A * | 1/1990 | Turner | B01D 53/0407 |
| | | | 123/519 |
| 5,641,344 A * | 6/1997 | Takahashi | B01D 53/0415 |
| | | | 123/519 |
| 5,910,637 A * | 6/1999 | Meiller | F02M 25/0854 |
| | | | 123/519 |
| 7,322,343 B2 | 1/2008 | Yamada et al. | |
| 7,677,277 B2 * | 3/2010 | Thompson | B60K 15/03504 |
| | | | 123/519 |
| 8,177,894 B2 | 5/2012 | Yoshida et al. | |
| 8,733,325 B2 | 5/2014 | Takamatsu | |
| 2007/0144496 A1 * | 6/2007 | Bellmore | F02M 25/0836 |
| | | | 123/519 |

FOREIGN PATENT DOCUMENTS

| | | |
|---|---|---|
| JP | 2000-119455 A | 4/2000 |
| JP | 2000-199455 A | 7/2000 |
| JP | 2003-013814 A | 1/2003 |
| JP | 2007-146793 A | 6/2007 |
| JP | 2010007573 A | 1/2010 |
| JP | 2012193662 A | 10/2012 |

OTHER PUBLICATIONS

Office Action, issued May 3, 2016, in Korean Patent Application No. 10-2014-0157885.
Notification of Reason for Refusal, Korean Patent Application No. 10-2014-0157885.
Office Action issued Jan. 5, 2017 in Japanese Application No. 2013-267593.

* cited by examiner

EVAPORATED FUEL PROCESSING APPARATUS

BACKGROUND OF THE INVENTION (1) Field of the Invention

The present invention relates to an evaporated fuel processing apparatus.

(2) Description of Related Art

In order to prevent evaporated fuel from being emitted from a fuel tank or the like of a vehicle into atmosphere, the evaporated fuel generated in the fuel tank or the like is caused to flow into an evaporated fuel processing apparatus (hereinafter also referred to as "canister") provided with an adsorbent layer filled with activated carbon that adsorbs/desorbs the evaporated fuel so as to cause the evaporated fuel to be temporarily adsorbed by the activated carbon.

Some of the evaporated fuel introduced into the canister may become a liquid component before being adsorbed to the activated carbon. When the activated carbon adsorbs this re-liquefied evaporated fuel, the adsorption performance of the activated carbon may deteriorate.

As a conventional canister that prevents deterioration of the adsorption performance of this activated carbon, a canister including a casing is known, in which the casing is provided with a tank port, a purge port and an atmospheric port, and the casing includes a vapor-liquid separator that separates evaporated fuel introduced from the tank port into a liquid phase component and a vapor phase component thereof, respectively (e.g., see JPA-2000-199455).

However, in the conventional canister, a filter for separating the vapor-liquid separator from the adsorbent layer is fixed to a bottom surface of a liquid storing member that makes up the vapor-liquid separator so as to store the liquid phase component, and therefore when activated carbon making up the adsorbent layer is refined due to vibration or the like, and when the volume of the adsorbent layer decreases, a space may be produced between the filter and the adsorbent layer. If the liquid storing member and the filter move up and down due to vibration or the like in the presence of this space, sound may be generated, and it is therefore necessary to firmly fix the liquid storing member within the casing to prevent the liquid storing member from moving up and down to thereby avoid sound from being generated.

Thus, since the liquid storing member needs to be firmly fixed within the casing by using orbital vibration welding or the like, there is a problem that large-scale equipment is required.

SUMMARY OF THE INVENTION

It is therefore an object of the present invention to provide an evaporated fuel processing apparatus capable of easily forming a vapor-liquid separator compared to the conventional canister.

In order to solve the above-described problem, an evaporated fuel processing apparatus according to the present invention has a configuration including a casing provided with a tank port, and the casing includes at least one adsorbent layer filled with adsorbent which adsorbs/desorbs evaporated fuel generated in a fuel tank or the like; a vapor-liquid separator separating the evaporated fuel introduced from the tank port into a vapor phase component and a liquid phase component thereof, respectively; and, a filter separating the vapor-liquid separator from the adsorbent layer, and, a liquid storing member, which is a component separate from the casing, and is opened at at least a tank port side for storing the separated liquid phase component, is attached in the casing, and, the filter is fixed to an inner surface of the casing and the liquid storing member is sandwiched between the casing and the filter.

In the present invention, the liquid storing member may be formed in a cup shape having a bottom part and a peripheral wall, and a channel that communicates between the vapor-liquid separator and the adsorbent layer may be formed between the peripheral wall and the casing.

In the present invention, the liquid storing member may be formed in a cup shape having a bottom part and a peripheral wall, and a channel pipe that communicates between an inside and an outside thereof may be formed at the bottom part so that the channel pipe causes the vapor-liquid separator and the adsorbent layer to communicate with each other.

In the present invention, the filter and the liquid storing member may be biased toward the tank port side by a biasing member.

In the present invention, the liquid storing member may be attached to the casing by snap fitting means.

In the present invention, the liquid storing member may be attached to the casing by causing the liquid storing member to be press-fitted in against the inner circumferential surface of the casing.

In the present invention, by fixing the filter to the inner surface of the casing and by sandwiching the liquid storing member between the casing and the filter, it can prevent the liquid storing member from moving by the filter and the inner surface of the casing, and thereby prevent sound from being generated due to the movement of the liquid storing member. This eliminates the need for firmly fixing the liquid storing member to the inner circumferential surface of the casing as in the case of the canister in the prior art. It is also possible to more easily form the liquid phase separator than the canister of the prior art, and the manufacturing equipment thereof does not require so large-scale equipment as that of the prior art, so as to achieve simplification and cost reduction.

DESCRIPTION OF THE INVENTION

Embodiments according to the present invention will be described based on the accompanying drawings.

Embodiment 1

Figure 1:
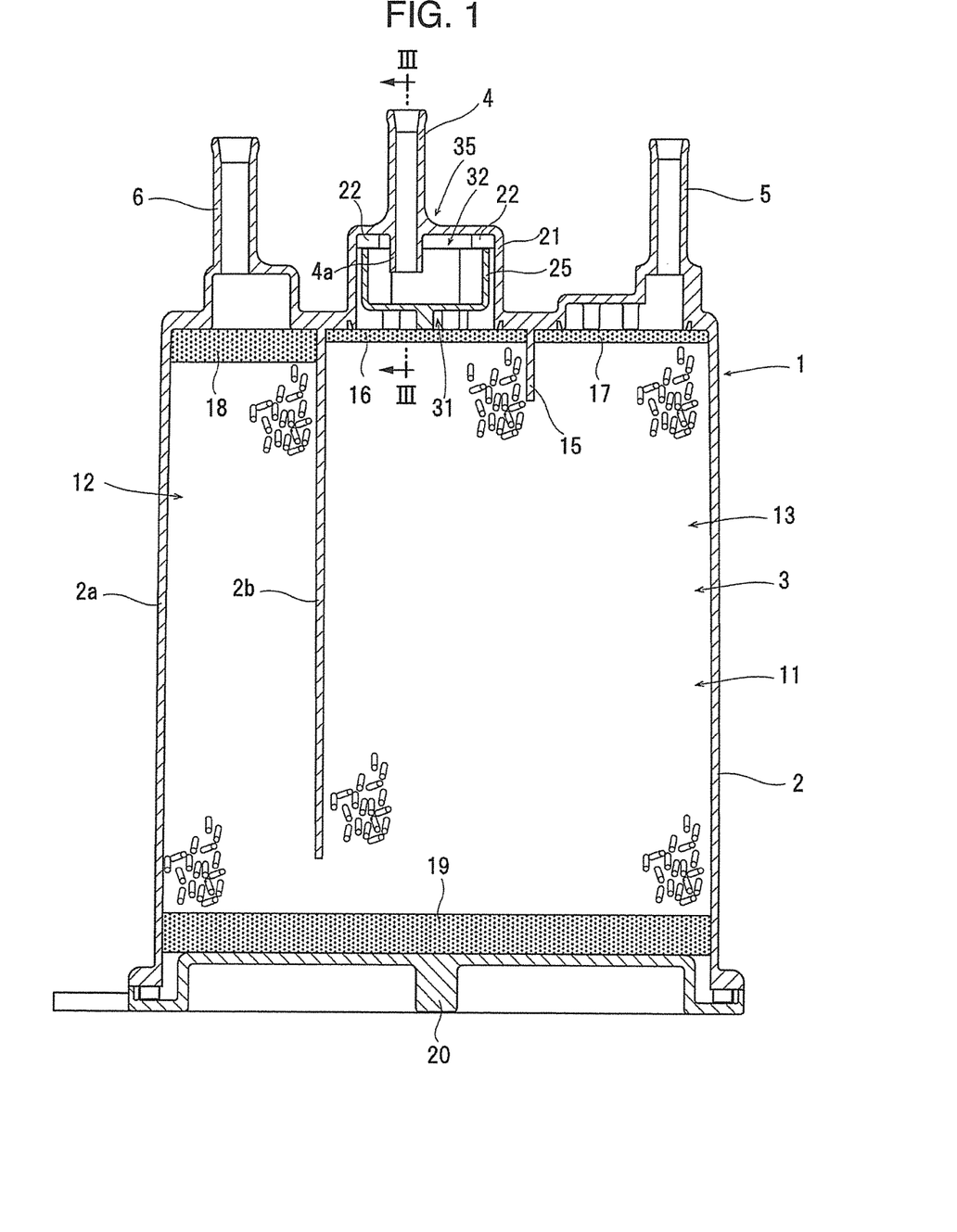
FIG. 1 is a cross-sectional view of an evaporated fuel processing apparatus according to Embodiment 1 of the present invention.

FIG. 1 illustrates Embodiment 1 according to the present invention.

As shown in FIG. 1, an evaporated fuel processing apparatus 1 of the present invention has a casing 2, a passage 3 that allows a fluid to circulate is formed in the casing 2, and a tank port 4 and a purge port 5 are formed on one end side of the passage 3 in the casing 2 and an atmospheric port 6 is formed on the other end side.

As shown in FIG. 1, in a body 2a of the casing 2, a main chamber 11 that communicates with the tank port 4 and the purge port 5, and a sub-chamber 12 that communicate with the atmospheric port 6 are formed, and the main chamber 11 is separated from the sub-chamber 12 by a barrier 2b. This main chamber 11 communicates with the sub-chamber 12 on the opposite side to the atmospheric port 6 so that fluid flows through the passage 3 in a substantially U shape.

An adsorbent layer 13 filled with adsorbent that can adsorb an evaporated fuel component is placed in the main chamber 11 and the sub-chamber 12. Those parts of the adsorbent layer 13 communicate with each other on the opposite side of the atmospheric port 6 as shown in FIG. 1. Activated carbon is used as the adsorbent in the present embodiment.

The tank port 4 communicates with an upper air chamber (not shown) in a fuel tank and the purge port 5 is connected to an intake passage of an engine via a purge control valve (VSV) (not shown). The opening of this purge control valve is controlled by an electronic control unit (ECU) and subjected to purge control based on measured values of an A/F sensor or the like during operation of the engine. The atmospheric port 6 communicates with the outside via a passage (not shown).

A baffle board 15 that extends from an inner surface of the casing 2 to part of the adsorbent layer 13 is provided between the tank port 4 and the purge port 5 of the casing 2. The baffle board 15 causes the fluid flowing between the tank port 4 and the purge port 5 to circulate through the adsorbent layer 13.

The adsorbent layer 13 is covered with a filter 16 made of non-woven fabric cloth or the like on its tank port 4 side and covered with a filter 17 made of non-woven fabric cloth or the like on its purge port 5 side. Furthermore, the adsorbent layer 13 is covered with a filter 18 made of non-woven fabric cloth or the like on its atmospheric port 6 side. The filters 16, 17 and 18 are welded to the inner circumferential surface of the body 2a of the casing 2 by ultrasound vibration or the like. The filters 16, 17 and 18 may also be fixed to the inner circumferential surface of the body of the casing 2 using optional fixing means such as an adhesive.

A filter 19 made of urethane or the like is provided on the opposite side of the atmospheric port 6 to the adsorbent layer 13, which covers the entire surface thereof. This filter 19 is accommodated in a condition that a cover member 20 compresses it which is provided on the opposite side to the adsorbent layer 13, so as to play a role of a biasing member that biases the adsorbent layer 13 toward the tank port 4 side.

Note that the filter 19 may also be biased toward the tank port 4 side using an optional biasing member such as a spring.

An expanding part 21 that expands from the body 2a to the tank port 4 side is formed on the casing 2 and this expanding part 21 is formed so as to be positioned between the tank port 4 and the adsorbent layer 13.

Figure 2:
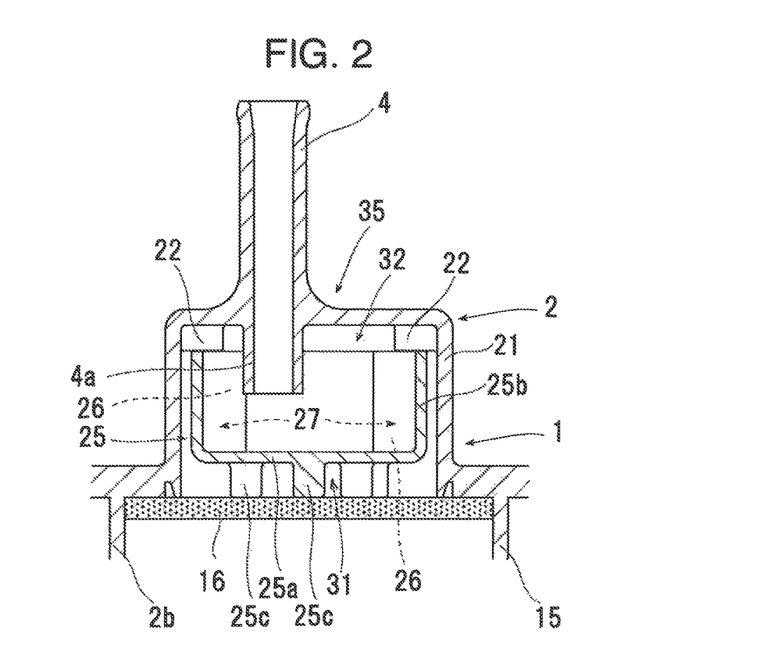
FIG. 2 is an enlarged cross-sectional view of a substantial part of the evaporated fuel processing apparatus in FIG. 1.
Figure 3:
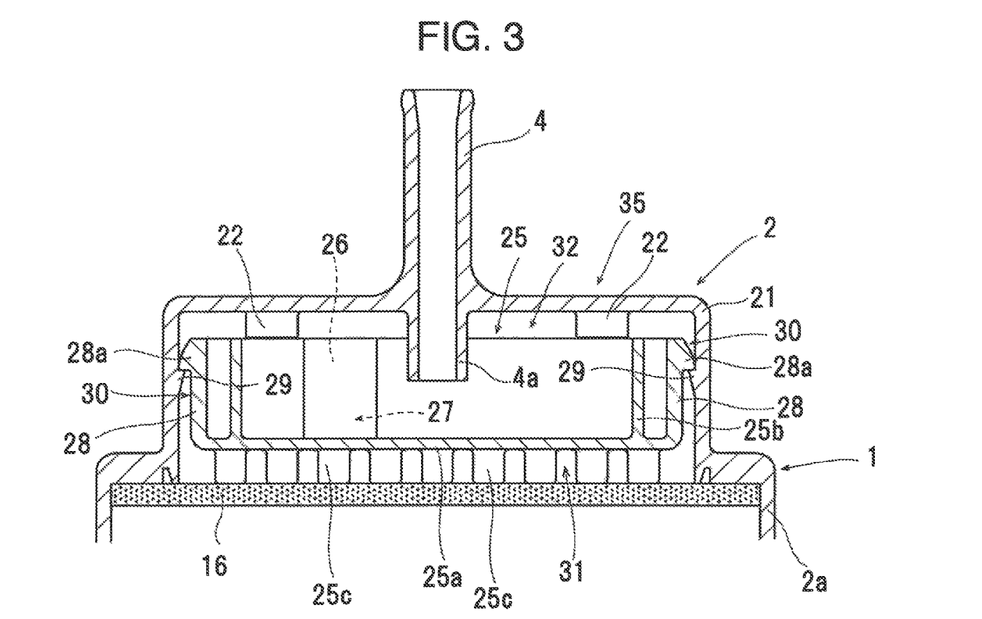
FIG. 3 is a cross-sectional view along a line III-III in FIG. 1.

As shown in FIGS. 1 to 3, a hollow annular member 4a that makes up the tank port 4 protrudes inside the expanding part 21 and is opened in the expanding part 21. A plurality of protruding space forming members 22 are formed in the inner surface on the tank port 4 side in the expanding part 21, and the space forming members 22 are formed integrally with the inner circumferential surface of the expanding part 21 of the casing 2.

A cup-shaped liquid storing member 25 is provided inside the expanding part 21, which includes a bottom part 25a and a peripheral wall 25b, and is opened on an opposite side to the bottom part 25a. There are two concave parts 26 formed in an outer circumferential surface of the peripheral wall 25b of the liquid storing member 25, which are formed by bending the peripheral wall 25b. The perimeter of the bottom part 25a is formed in a shape following the peripheral wall 25b.

Figure 4:
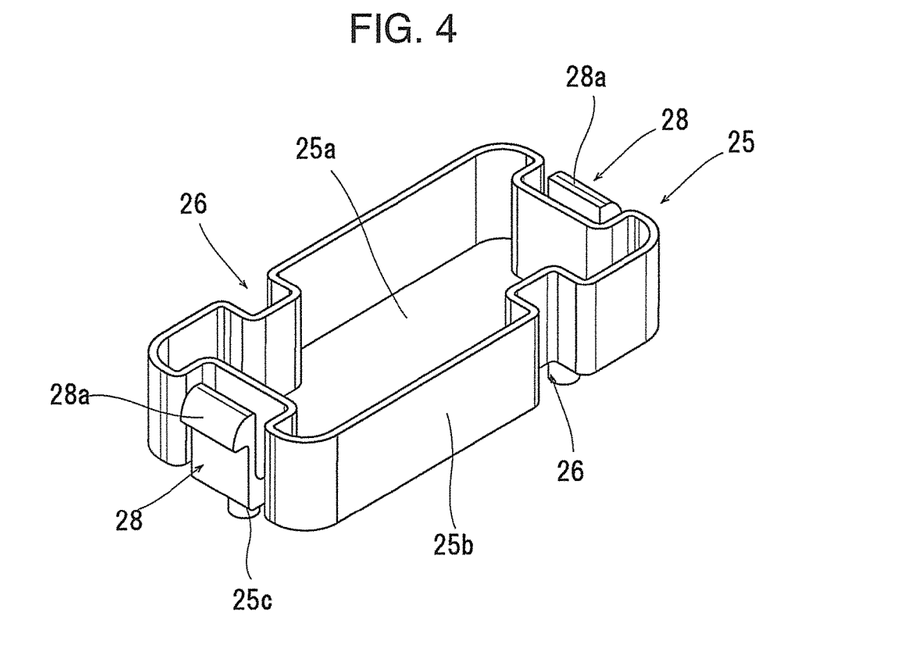
FIG. 4 is a perspective view of a liquid storing member used for Embodiment 1 of the present invention.
Figure 5:
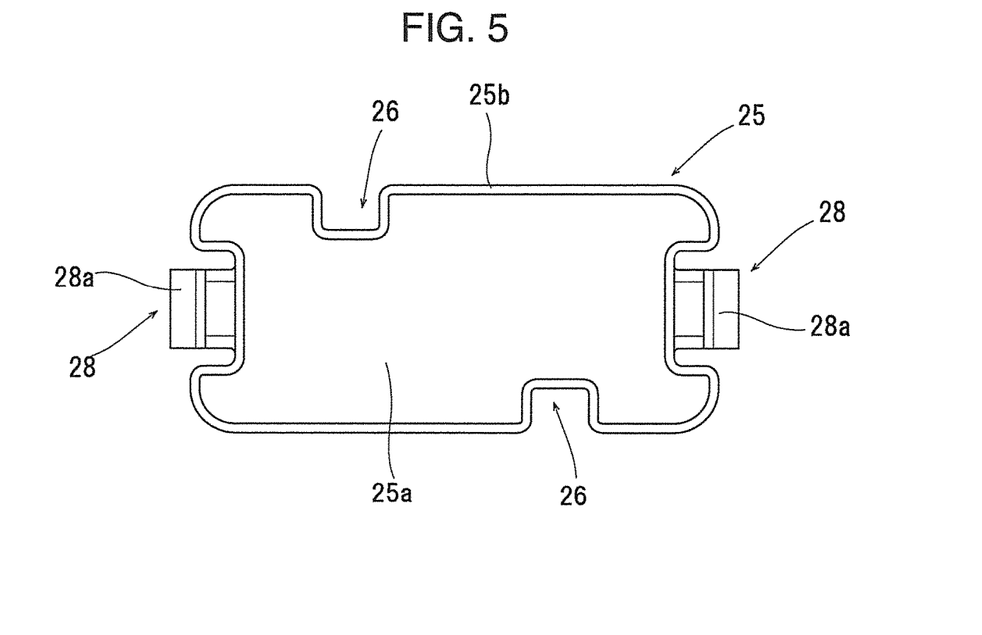
FIG. 5 is a top view of the liquid storing member in FIG. 4.
Figure 6:
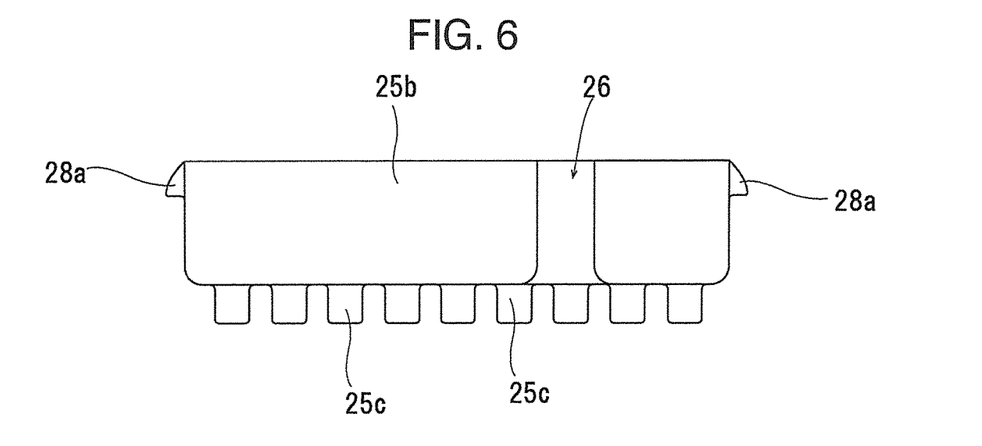
FIG. 6 is a front view of the liquid storing member in FIG. 4.
Figure 7:
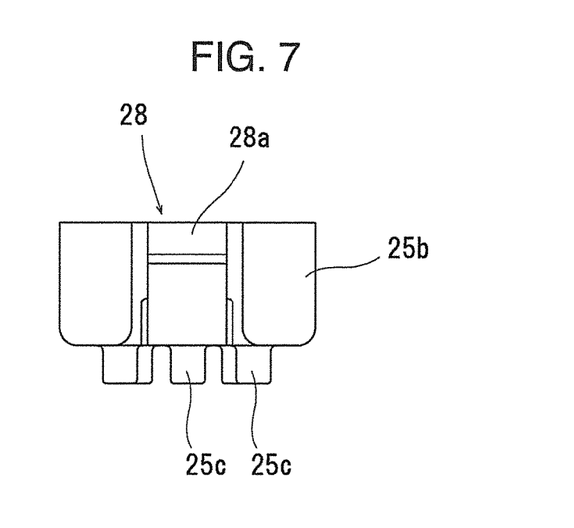
FIG. 7 is a right side view of the liquid storing member in FIG. 4.

As shown in FIG. 4, a pair of elastic engaging parts 28, 28 that are fixed to the bottom part 25a side and shaped like a flat spring protruding on the tank port 4 side are provided in opposed positions of the peripheral wall 25b of the liquid storing member 25. A lug 28a is formed on the outside of the top end of each engaging part 28. On the other hand, engaged parts 29 with which the lugs 28a engage are formed on the inner circumferential surface of the casing 2. The engaging parts 28 and the engaged parts 29 constitute snap fitting means 30 and the snap fitting means 30 allows the liquid storing member 25 to be attached to the inner circumferential surface of the casing 2.

A plurality of leg parts 25c that protrude on the adsorbent layer 13 side are formed on the bottom part 25a of the liquid storing member 25. The leg parts 25c are formed so as to contact the filter 16 and a space 31 is formed between the filter 16 and the bottom part 25a.

The space forming members 22 are positioned between the end face of the peripheral wall 25b of the liquid storing member 25 and the casing 2 so as to form a space 32 between an end face of the peripheral wall 25b of the liquid storing member 25 and the casing 2.

A channel 27 is formed between the concave part 26 provided in the peripheral wall 25b and the inner circumferential surface of the casing 2. The annular member 4a that makes up the tank port 4 is opened in the liquid storing member 25.

The expanding part 21 and the liquid storing member 25 constitute a vapor-liquid separator 35 that separates the evaporated fuel introduced from the tank port into a vapor phase component and a liquid phase component thereof, and the filter 16 separates the vapor-liquid separator 35 from the adsorbent layer 13. The vapor-liquid separator 35 and the adsorbent layer 13 communicate with each other through the channel 27, and spaces 31 and 32.

The liquid storing member 25 is sandwiched between the filter 16 and the inner circumferential surface of the casing 2, which restrains its movement in the direction of the channel 3 (vertical direction in FIG. 1).

The filter 16 and the liquid storing member 25 are biased by the filter 19 which is a biasing member via the adsorbent layer 13 toward the tank port 4 side and are restrained from moving in the direction of the channel 3.

In the above-described configuration, a gas containing evaporated fuel introduced from the tank port 4 into the evaporated fuel processing apparatus 1 is separated into the liquid phase component and the vapor phase component through the vapor-liquid separator 35, and then the vapor phase component thereof passes through the space 32 and the channel 27, flows into the adsorbent layer 13 where its fuel component is adsorbed by the adsorbent and the rest is emitted from the atmospheric port 6 into the atmosphere.

On the other hand, in the case of purge control during operation of the engine, a purge control valve is opened by an electronic control unit (ECU) and the air taken into the evaporated fuel processing apparatus 1 from the atmospheric port by a negative pressure in the intake passage flows in a direction opposite to the above-described direction and is supplied from the purge port 5 into the intake passage of the engine. In that case, the fuel component adsorbed to the adsorbent in the adsorbent layer 13 is desorbed and supplied to the engine together with the air.

As described above, the filter 16 is fixed to the inner circumferential surface of the casing 2 and the liquid storing member 25 is sandwiched between the filter 16 and the inner circumferential surface of the casing 2, which restrains the movement in the vertical direction in FIG. 1, making it possible to prevent the liquid storing member 25 from moving and producing sound due to vibration or the like when the evaporated fuel processing apparatus 1 is used.

In addition, by the snap fitting means 30 and the matter that the liquid storing member 25 is sandwiched between the filter 16 and the casing 2, it is possible to restrain the movement of the liquid storing member 25, and to configure the vapor-liquid separator 35 more easily than the canister of the above-described prior art, and also to simplify its manufacturing equipment more than the prior art.

In addition, since the liquid storing member 25 is attached to the inner circumferential surface of the casing 2 by the snap fitting means 30, it is also possible to restrain its movement in a direction orthogonal to the channel 3 (lateral direction in FIGS. 2 and 3) and prevent the liquid storing member 25 from moving in that direction and producing sound due to vibration or the like when the evaporated fuel processing apparatus 1 is used.

Even if the engagement by the snap fitting means 30 is released, since the liquid storing member 25 is sandwiched between the filter 16 and the casing 2, the movement in the vertical direction in FIG. 1 of the liquid storing member 25 is restrained. Thus, regarding the attachment of the liquid storing member 25 to the casing 2, if the liquid storing member 25 can be held at a predetermined position of the casing 2 during manufacturing, any optional attaching means can be used to attach the liquid storing member 25 to the casing 2.

Embodiment 2

In Embodiment 1, the channel 27 is formed between the concave part 26 provided in the peripheral wall 25*b* of the liquid storing member 25 and the inner circumferential surface of the casing 2, and the point is that a channel is formed between the peripheral wall 25*b* of the liquid storing member 25 and the inner circumferential surface of the casing 2 and the vapor-liquid separator 35 and the adsorbent layer 13 can communicate with each other through this channel, and the shape and structure of the channel can be optionally set.

For example, without providing the space forming members 22 and without forming the space 32 between the end face of the peripheral wall 25*b* of the liquid storing member 25 and the casing 2, the end of the concave part 26 provided in the peripheral wall 25*b* of the liquid storing member 25 may be notched so that the inside of the liquid storing member 25 and the channel 27 communicate with each other.

On the other hand, instead of providing any concave part in the peripheral wall 25*b* of the liquid storing member 25, a concave part may be provided in the inner circumferential surface of the casing 2, and a channel may be formed of the peripheral wall 25*b* of the liquid storing member 25 and the concave part provided in the inner circumferential surface of the casing 2 so that the vapor-liquid separator 35 and the adsorbent layer 13 communicate with each other through this channel.

Since the rest of the structure is the same as that in Embodiment 1 above, description thereof will be omitted.

Embodiment 2 also has operations and effects similar to those of Embodiment 1.

Embodiment 3

FIG. 8 to FIG. 11 illustrate Embodiment 3.

Embodiment 3 is an embodiment in which a vapor-liquid separator 42 is configured using a liquid storing member 41 which is different from the liquid storing member 25 in Embodiments 1 and 2.

The liquid storing member 41 of Embodiment 3 includes a rectangular bottom part 41*a* and a peripheral wall 41*b* following the outer circumferential surface of the bottom part 41*a*, and the bottom part 41*a* is provided with a channel pipe 41*c* that communicates the inside and outside of the bottom part 41*a*. Moreover, a plurality of leg parts 41*d* are provided on the adsorbent layer 13 side of the bottom part 41*a*.

Figure 8:
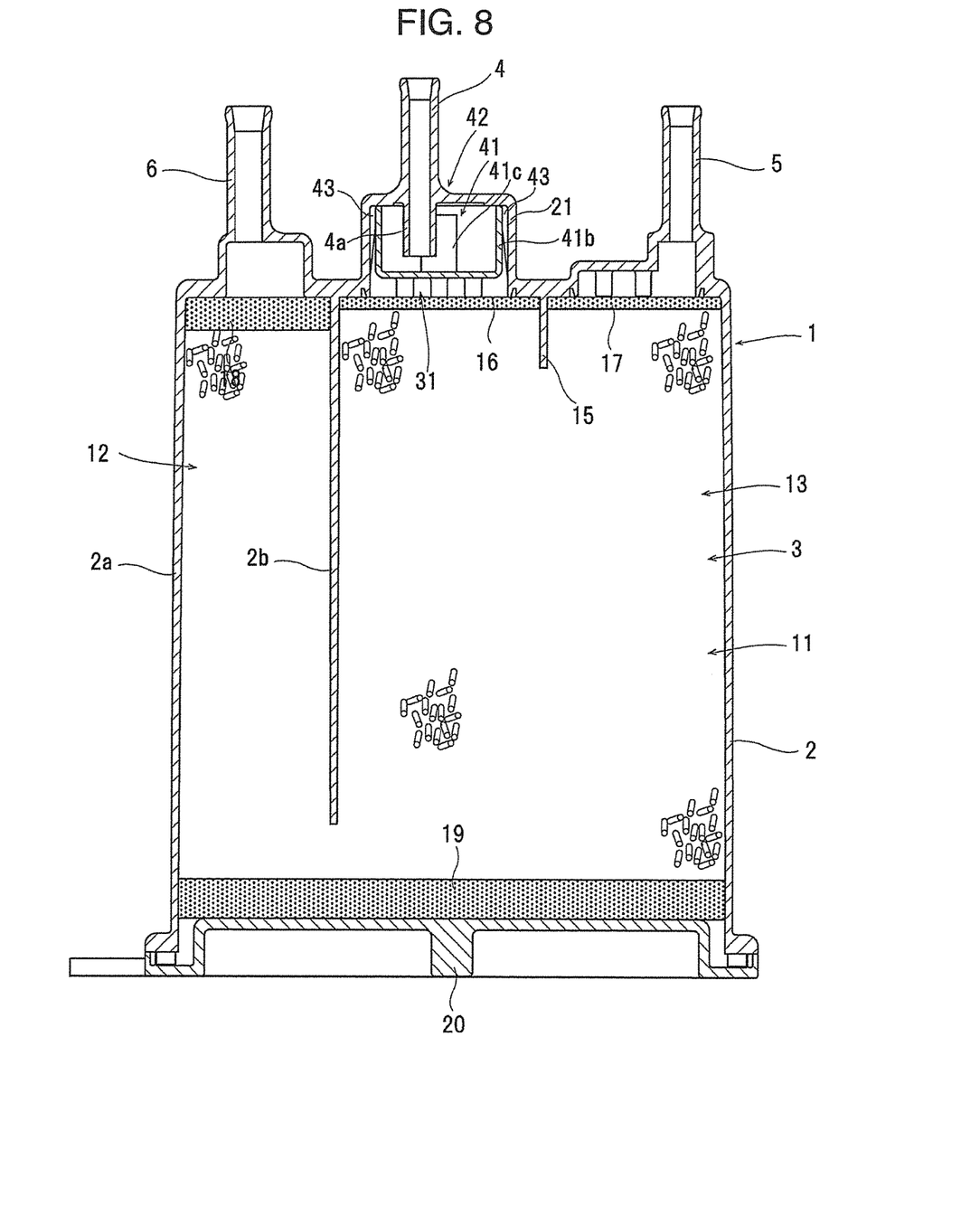
FIG. 8 is a cross-sectional view of an evaporated fuel processing apparatus according to Embodiment 2 of the present invention.
Figure 9:
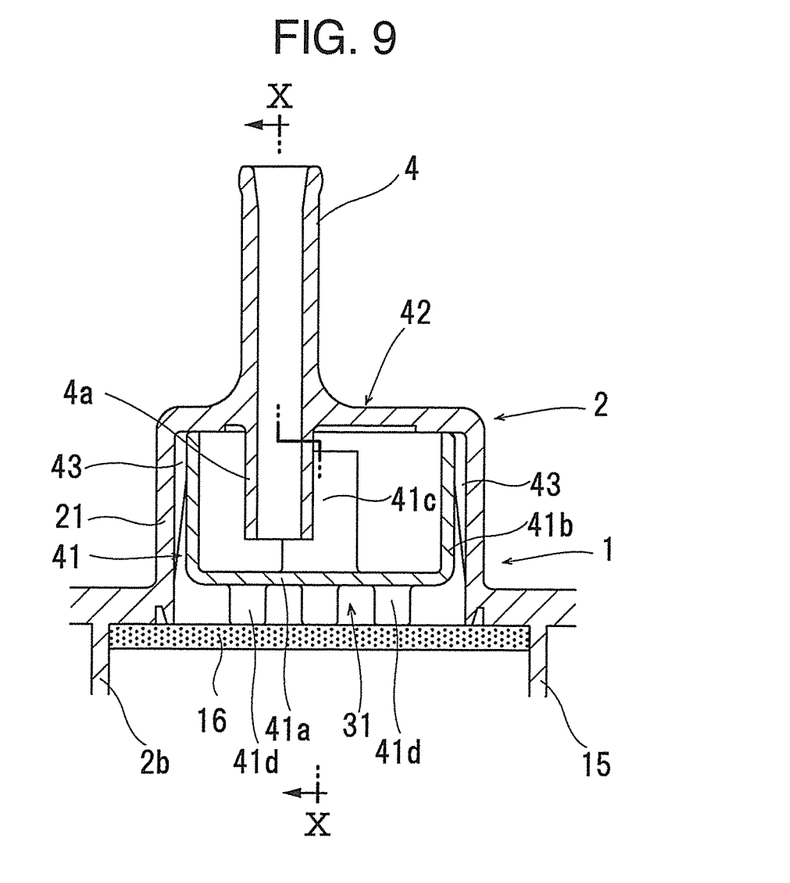
FIG. 9 is an enlarged cross-sectional view of a substantial part of the evaporated fuel processing apparatus in FIG. 8.

The channel pipe 41*c* is constructed of an annular hollow pipe, an end on the tank port 4 side of which is positioned closer to the inside of the liquid storing member 41 than the end of the peripheral wall 41*b* and closer to the tank port 4 side than an opening end of the annular member 4*a* making up the tank port 4. An end of the channel pipe 41*c* on the adsorbent layer 13 side is set to be substantially equal to the bottom surface of the bottom part 41*a*.

Figure 10:
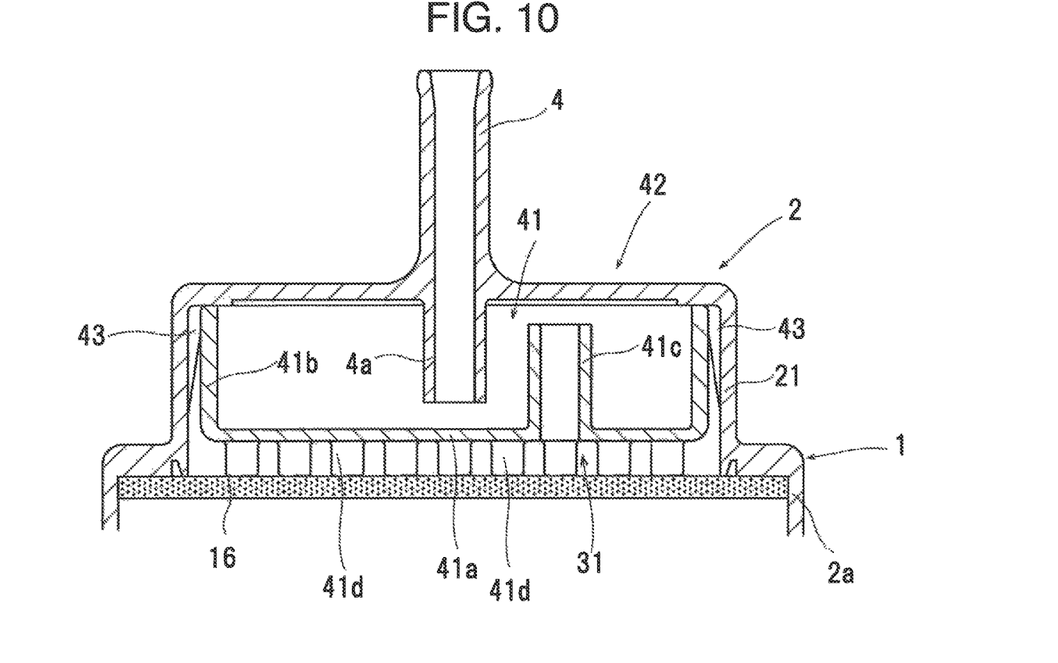
FIG. 10 is a cross-sectional view along a line X-X in FIG. 9.
Figure 11:
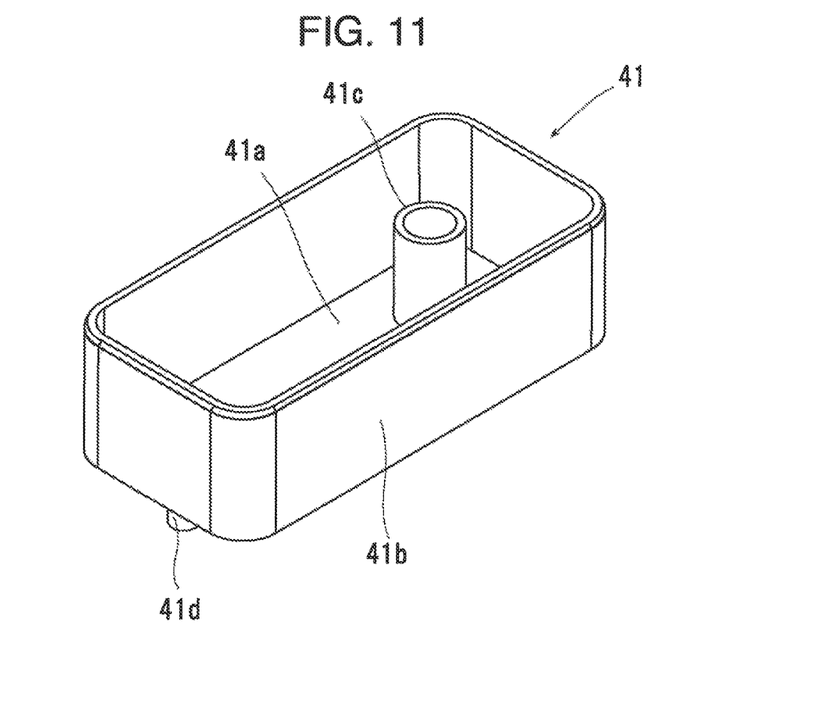
FIG. 11 is a perspective view of a liquid storing member used for Embodiment 2 of the present invention.

Protrusions 43 are formed at appropriate intervals on the four inner circumferential surfaces of the expanding part 21 in the casing 2. The protrusions 43 on the filter 16 side are tapered so as to protrude mote inward as being closer to the tank port 4.

Since the peripheral wall 41*b* of the liquid storing member 41 is press-fitted in against these protrusions 43, the liquid storing member 41 is thereby attached to the inner circumferential surface of the expanding part 21 in the casing 2 and is prevented from moving in a direction orthogonal to the channel 3.

Since the rest of the structure is the same as that in Embodiments 1 and 2, description thereof will be omitted.

Embodiment 3 also has operations and effects similar to those of Embodiment 1.

Embodiment 4

In Embodiments 1 to 3, the liquid storing member 25 or 41 is provided in the expanding part 21 of the casing 2 and the vapor-liquid separator 35 or 42 is formed, but instead of providing the expanding part 21 that expands from the body 2*a* in the casing 2, a containing part corresponding to the expanding part 21 that is to contain the liquid storing member 25 or 41 may be formed in the body 2a, and the liquid storing member 25 or 41 may be formed in the containing part to form a vapor-liquid separator.

This vapor-liquid separator is formed so as to be positioned between the tank port 4 and the adsorbent layer 13, and the filter 16 separates the vapor-liquid separator from the adsorbent layer 13.

Since the rest of the structure is the same as that in Embodiments 1 and 2, description thereof will be omitted.

Embodiment 4 also has operations and effects similar to those of Embodiment 1 above.

Other Embodiments

The number of adsorbent layers may be one or more as long as the above-described vapor-liquid separator 35 or 42 is provided between the tank port 4 and the adsorbent layer 13. A space layer without any adsorbent provided between the neighboring adsorbent layers may be formed. In addition, the arrangement of the adsorbent layers and the shape of the channel made up of the adsorbent layers may be optionally set without being limited to the aforementioned embodiments.

The invention claimed is:

1. An evaporated fuel processing apparatus comprising a casing provided with a tank port,
    wherein said casing comprises at least one adsorbent layer filled with adsorbent which adsorbs/desorbs evaporated fuel generated in a fuel tank, a vapor-liquid separator separating the evaporated fuel introduced from the tank port into a vapor phase component and a liquid phase component thereof, respectively, and, a filter separating said vapor-liquid separator from said adsorbent layer, and
    wherein a liquid storing member which is a component independent of said casing and is opened at at least a tank port side for storing said separated liquid phase component is attached in the casing, a surface of said filter on a liquid storing member side contacting a top end of an inner surface of said casing and said filter is fixed to at least a portion of the top end of the inner surface of said casing, and thereby said liquid storing member is sandwiched between the casing and the filter.

2. An evaporated fuel processing apparatus comprising a casing provided with a tank port,
    wherein said casing comprises at least one adsorbent layer filled with adsorbent which adsorbs/desorbs evaporated fuel generated in a fuel tank, a vapor-liquid separator separating the evaporated fuel introduced from the tank port into a vapor phase component and a liquid phase component thereof, respectively, and, a filter separating said vapor-liquid separator from said adsorbent layer,
    wherein a liquid storing member which is a component separate from said casing and is opened at at least a tank port side for storing said separated liquid phase component is attached in the casing, and said filter is fixed to an inner surface of said casing and said liquid storing member is sandwiched between the casing and the filter, and
    wherein said liquid storing member is formed in a cup shape having a bottom part and a peripheral wall, and a channel which communicates between said vapor-liquid separator and said adsorbent layer is formed between said peripheral wall and said casing.

3. The evaporated fuel processing apparatus according to claim 1, wherein said liquid storing member is formed in a cup shape having a bottom part and a peripheral wall, and a channel pipe which communicates between an inside and an outside thereof is formed at said bottom part so that said channel pipe causes said vapor-liquid separator and said adsorbent layer to communicate with each other.

4. The evaporated fuel processing apparatus according to claim 1, wherein said filter and said liquid storing member are biased toward the tank port side by a biasing member.

5. The evaporated fuel processing apparatus according to claim 1, wherein said liquid storing member is attached to said casing by snap fitting means.

6. The evaporated fuel processing apparatus according to claim 1, wherein said liquid storing member is attached to said casing by causing said liquid storing member to be press-fitted in against the inner circumferential surface of said casing.

* * * * *